H. & R. STÄUBLI.
APPLIANCE FOR USE WITH RING SPINNING MACHINES.
APPLICATION FILED DEC. 19, 1912.
1,109,309.
Patented Sept. 1, 1914.
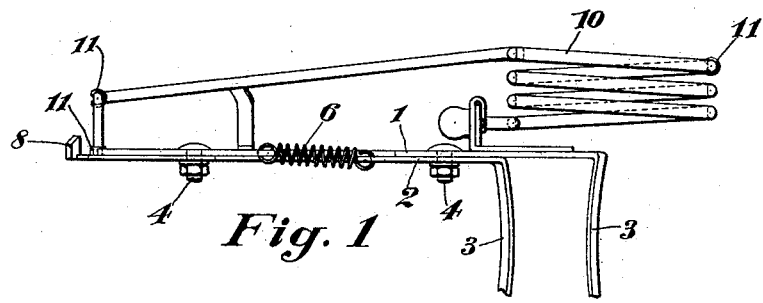
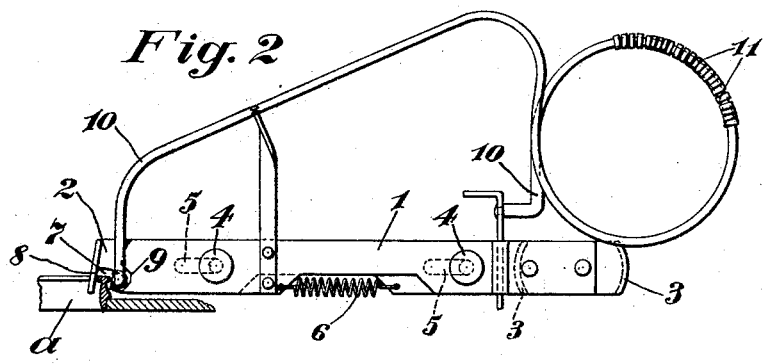
Witnesses:
Inventor:
Hermann Stäubli and Robert Stäubli
by
Attorney

UNITED STATES PATENT OFFICE.

HERMANN STÄUBLI AND ROBERT STÄUBLI, OF HORGEN, SWITZERLAND.

APPLIANCE FOR USE WITH RING-SPINNING MACHINES.

1,109,309.  Specification of Letters Patent.  Patented Sept. 1, 1914.

Application filed December 19, 1912. Serial No. 737,699.

*To all whom it may concern:*

Be it known that we, HERMANN STÄUBLI and ROBERT STÄUBLI, both citizens of Switzerland, and residents of Horgen, in the Canton of Zurich, Switzerland, have invented an Appliance for Use with Ring-Spinning Machines, of which the following is a specification.

This invention relates to a simple and effective device for placing the runners or travelers on the rings in ring spinning machines. Hitherto the runners were placed on the rings either by hand or with tongs which took a considerable time and also involved great expense.

According to this invention the runners are led automatically between two bars or jaws movable relative to each other, the said bars or jaws being so formed and operated that they are adapted to spring the runners over the edge of the ring when moved toward one another.

In order that this invention may be clearly understood reference is made to the accompanying drawing, in which:—

Figure 1 shows a plan of the device as seen from below; Fig. 2 shows an elevation of Fig. 1.

According to our invention we make provision of the two bars 1 and 2, each of which is provided with a handle 3. Mounted on the bar 1 are two bolts 4 which pass through slits 5 in the bar 2 and are provided with nuts and washers for junction purposes. The two bars 1 and 2 are longitudinally slidable and connected by a spring 6 which tends to hold them in the position shown in Fig. 1. The front end of bar 2 has a recess 7 and a depending nose 8 which can be placed above the upper edge of the ring designated by *a*. The bar 1 is also provided at 9 with a recess in which the runners or travelers 11 can be placed by means of a guide wire 10. The said bars 1 and 2 are moved in order to put a runner in place. The wire 10 thus serves as a holder for the runners 11 and is so shaped that the latter, when reaching the recess 9, are presented with their open faces toward the ring *a*.

The function of the device is as follows: The runners or travelers 11, subsequently to being put on the guide wire 10, are caused to slide toward the rounded off end of the latter, the said end being free and springy and abutting against the bar 2. When this bar, by means of the recess 7, has been placed on the ring as clearly indicated in Fig. 2, the bar 1 is moved toward the front end 8 of the bar 2 by contracting the handles 3. This results in the recessed portion 9 of the bar 1 pressing against the foremost runner which is caused to be moved toward the ring. The free end of the wire 10 is simultaneously pushed sidewise while the runner is forced on and over the edge of the ring. The handles are thereafter released and, with the next runner reaching the position shown in Fig. 2, the whole operation is repeated.

The guide wire is of course capable of being constructed otherwise than as shown, to suit requirements.

Having now fully described our said invention what we claim and desire to secure by Letters Patent is:—

A device for placing the runners on the rings of ring spinning machines, comprising in combination two bars which are movable relative to each other, handles integrally formed at one end of said bars, both bars having a recess at the other end and one bar having a nose adapted to engage the inner edge of the ring, a spring connecting the two bars, and a guide wire for the runners, one end thereof mounted on the bar having a recess only and the other end being inclined and terminating opposite the said recess, all substantially as and for the purpose specified and shown.

In testimony whereof we have hereunto set out hands in the presence of two subscribing witnesses.

HERMANN STÄUBLI.
ROBERT STÄUBLI.

Witnesses:
V. LEODORBDINGA,
CARL GUBLER.

Copies of this patent may be obtained for five cents each, by addressing the "Commissioner of Patents, Washington, D. C."